OXIDATION RESISTANT HIGH ENERGY MAGNETIC MATERIAL

Filed Feb. 20, 1967

Inventors:
Archibald N. Wright,
John R. Feller,
by Paul R. Webb, II
Their Attorney.

United States Patent Office 3,480,553
Patented Nov. 25, 1969

3,480,553
OXIDATION RESISTANT HIGH ENERGY MAGNETIC MATERIAL

Archibald N. Wright, Schenectady, N.Y., and John R. Feller, Trufant, Mich., assignors to General Electric Company, a corporation of New York Filed Feb. 20, 1967, Ser. No. 617,371
Int. Cl. H01f *1/26, 10/00*
U.S. Cl. 252—62.54 10 Claims

ABSTRACT OF THE DISCLOSURE

High energy magnetic material composed of single domain magnetic particles with an oxidation inhibiting film on at least a portion of the surfaces of the particles. The film is formed by ultraviolet surface photopolymerization of a monomer in the gaseous phase.

This invention relates to high energy magnetic materials, and more particularly to high energy magnetic materials in which the fine particles are coated with an oxidation inhibiting film on at least a portion of their surfaces.

Widespread use of magnetic and permanent magnet materials in sensitive instruments, electrical apparatus, and other equipment has occasioned a demand for more effective and less costly magnetic materials. As a principal element for magnetic material, iron is of course particularly desirable because of its cheapness and abundance.

In U.S. Letters Patent 2,974,104 issued Mar. 7, 1961, for "High Energy Magnetic Material," there is described and claimed a high energy magnetic material which comprises high energy elongated fine particles, the dimensions of each of the particles being that of a single magnetic domain, and the particles selected from the class consisting of (1) iron and (2) alloys of cobalt and iron in atomic ratios of up to three to one.

In U.S. Letters Patent 3,156,650, issued Nov. 10, 1964, for "Oxide Coated Iron-Cobalt Alloy Magnetic Material," there is described and claimed a high energy magnetic material which comprises high energy fine particles, the dimensions of each of the particles being that of a single magnetic domain, each of the particles consisting essentially of a core of an alloy of iron and cobalt and a coating surrounding the core of an oxide of iron and cobalt. Both of these patents are assigned to the same assignee as the present application.

Stability of the above types of magnetic material is required to reduce the adverse effects of oxygen and moisture. Thus, it would be desirable to inhibit the further oxidation of these materials.

Our present invention is directed to improved high energy magnetic materials with high energy fine magnetic particles which have an adherent oxidation inhibiting film on at least a portion of the surfaces of the particles, which film is formed by ultraviolet surface photopolymerization of a photopolymerizable gaseous monomer. The fine magnetic particles, which are employed in our invention, are of the types set forth and claimed in the above-mentioned U.S. Letters Patent. Such a photopolymerizable gaseous monomer is a gas in which the molecules upon surface ultraviolet radiation produce an intermediate species capable of polymerization. Gaseous 1,3-butadiene is very suitable as the monomer. However, other monomers, which are useful in forming such magnetic material include methyl methacrylate, hexachlorobutadiene, acrylonitrile, tetrafluoroethylene, trifluoromonochloroethylene, monofluorotrichloroethylene, hexafluorobutadiene, hexafluoropropylene, and mixtures thereof.

It is an object of our invention to provide improved high energy magnetic materials.

It is another object of our invention to provide such magnetic material in which an oxidation inhibiting film is formed by ultraviolet surface photopolymerization of a monomer in the gaseous phase on at least a portion of the surfaces of the particles.

It is a further object of our invention to provide such magnetic material from single domain magnetic particles of the above types.

It is a still further object of our invention to provide such magnetic material in a permanent magnet structure.

In accordance with our invention, high energy magnetic material can be formed which has high energy fine particles, the dimensions of each of the particles being that of a single magnetic domain, and an adherent oxidation inhibiting film on at least a portion of the surfaces of the particles, the film having been formed by ultraviolet surface photopolymerization of a monomer in the gaseous phase.

These and various other objects, features, and advantages of the invention will be better understood from the following description taken in connection with the accompanying drawing in which.

Figures 1, 2, 3, 4:
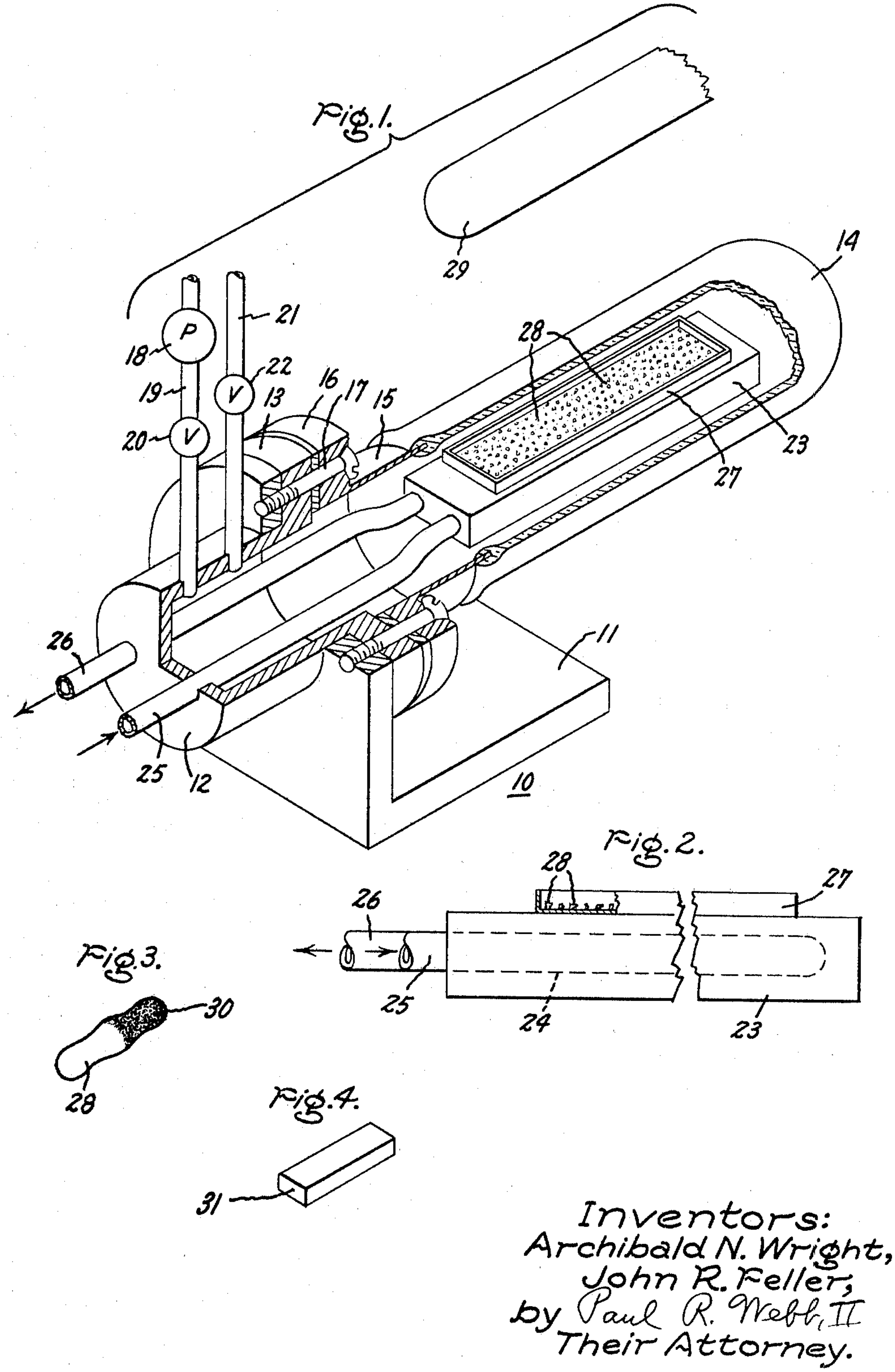
FIGURE 1 is a perspective view partially in section of an apparatus for forming oxidation inhibiting films on high energy magnetic fine particles in accordance with our invention.
FIGURE 2 is an enlarged side elevational view partially in section of a portion of the apparatus shown in FIGURE 1.
FIGURE 3 is a perspective view of a high energy magnetic fine particle with an oxidation inhibiting film adhering firmly to at least a portion of the surfaces of the particles.
FIGURE 4 is a perspective view of a high energy permanent magnet made in accordance with our invention.

In FIGURE 1 of the drawing, apparatus is shown generally at 10 for forming adherent oxidation inhibiting films on the surface of high energy magnetic fine particles. For example, these particles may be of the type described and claimed in the above mentioned U.S. Letters Patent 3,156,650, issued Nov. 10, 1964. A base or support surface (not shown) is provided on which is mounted an L-shaped bracket 11 to support enclosure or chamber 12 having a flange 13 at its open end. A quartz tube 14 is bonded adjacent its open end by any suitable metal-ceramic seal to a metal cylinder 15 having a flange 16 at its opposite end. Flange 16 is readily threaded to and unthreaded from flange 13 of enclosure 12 by means of a plurality of threaded fasteners 17. A vacuum pump 18 is connected by a line 19 to enclosure 12 to evacuate enclosure 12 and associated quartz tube 14. A control valve 20 is provided in evacuation line 19. An inlet line 21 is connected at one end to enclosure 12 and at its other end to a source (not shown) of material to be supplied in a gaseous state to tube 14. A control valve 22 is provided in line 21 to control the supply of material to enclosure 12 and tube 14.

A support block 23 of material such as copper, is positioned withn tube 14. Block 23 has a U-shaped metal tube 24 embedded therein, two ends 25 and 26 each of which extend through cylinder 15, flanges 16 and 13, enclosure 12 and through the wall of enclosure 12. Tube 24 circulates a cooling medium such as ethanol to block 23 and positions the block. The ends 25 and 26 of tube 24 are connected to a heat exchanger or to other cooling equipment. A metal tray 27 is shown positioned on support block 23. A plurality of high energy magnetic particles 28 are shown positioned in a generally monolayer arrangement within tray 27. An ultraviolet light 29, which is normally provided with a reflector (not shown), is shown outside in space above quartz tube 14 and supported in any suitable manner. Such a light source provides ultraviolet light in a region of about 2,000 angstroms to 3,500 angstroms, which is directed by the reflector (not shown) towards the upper surface of the high energy magnetic fine particles 28. For example, a Hanovia 700 watt lamp with a reflector will provide this particular light region. A metal enclosure with a door, which is not shown, is positioned around the above apparatus during its operation.

In FIGURE 2 of the drawing, an enlarged side elevational view is shown of support block 23 which was described above in connection with FIGURE 1 of the drawing. Block 23 has a U-shaped tube 24 imbedded therein, the two ends 25 and 26 of which circulate a cooling medium to and from block 23, respectively. Tray 27 is shown partially in section to disclose more clearly the high energy magnetic fine particles 28 therein.

In FIGURE 3 of the drawing, there is shown greatly enlarged a single domain magnetic particle 28. An oxidation inhibiting film 30 is shown adhering firmly to at least a portion of one surface of particle 28. Film 30 is formed on particle 28 in the apparatus shown in FIGURE 1 of the drawing.

In FIGURE 4 of the drawing there is shown a permanent magnet 31 which has been formed from a plurality of coated particles shown in FIGURE 3 of the drawing. Magnet 31 comprises a plurality of high energy magnetic fine particles coated with an oxidation inhibiting film 30 which are aligned and compacted. A method of preparing magnets from such particles is described, for example, in the above-mentioned U.S. Letters Patent 3,156,650, issued Nov. 10, 1964.

We discovered unexpectedly that high energy magnetic fine particles of the above types can be protected from further oxidation and subsequent degradation if the particles had an inherent oxidation inhibiting film on at least a portion of its surfaces formed in the manner described above. We found further that a superior permanent magnet structure is formed in which a plurality of high energy magnetic fine particles with the above type of film thereon are aligned and compacted. Such particles can also be bonded with organic binders or non-magnetic metals. We found also that these oxidation inhibiting films did not appear to have any degradation effects on the magnetic properties as measured on the finished magnets pressed from the coated particles.

In an illustrative operation of the apparatus shown in FIGURE 1 of the drawing, an aluminum tray 27 with a monolayer of high energy magnetic fine particles 28 therein was positioned on copper support block 23. Quartz tube 14 was then attached by its flange 16 to flange 13 of enclosure 12 by means of threaded fastener 17. Vacuum pump was started and pumped down the chamber defined by tube 14, cylinder 15 and enclosure 12 to a pressure of about 10 microns. Valve 20 was then closed. A monomer, 1,3-butadiene was supplied from a liquid source (not shown) through line 21 in a gaseous state to enclosure 12 whereby it was fed to the interior quartz tube 14. Such a material is retained initially in its liquid state by maintaining its temperature below room temperature which is accomplished by employing a cooling bath surrounding the liquid materials. The liquid is also maintained at a vapor pressure in the range of 3 to 8 millimeters of mercury by the temperature of the cooling bath whereby its introduction from the source to the inlet line is in the gaseous state. Ultraviolet lamp 29 was positioned above quartz tube 14 and spaced approximately two inches from the upper surface of the high energy magnetic fine particles 28. The lamp had an effective wave length in the range of 2,000 angstroms to 3,500 angstroms.

The monomer was introduced into quartz tube 14 and the pressure rose. A metal hood (not shown) was positioned around apparatus 10 since an ultraviolet light source was used. Lamp 29 was turned on. After a period of time, lamp 29 was shut off, monomer valve 22 was closed, and the system was re-evacuated to about 10 microns. In order to provide a film on a number of the surfaces of each of the high energy magnetic fine particles, metal tray 27 was agitated by holding a magnet against the exterior surface of tube 14 and then tapping the magnet against the tube. The above procedure was repeated several times. Lamp 29 was then shut off, monomer valve 22 was closed and the system pumped down to about 10 microns pressure to remove all byproducts. The metal hood was removed and the vacuum was then broken. Tube 14 was cooled to room temperature and disconnected by unthreading fasteners 17 which held its associated flange 16 to flange 13. After tube 14 was removed, tray 27 was taken off copper block 23 and the high energy magnetic fine particles were examined. The particles, when examined under a microscope, had a coating on at least a portion of the surfaces of each of the particles.

Such a high energy magnetic fine particle 28 with its film 30 thereon as described above is shown in FIGURE 3 of the drawing.

In FIGURE 4 of the drawing, there is shown a permanent magnet 31, which magnet is formed from a plurality of high energy magnetic fine particles 28, each of which has a film 30 coated thereon. This permanent magnet structure is formed, for example, in accordance with the procedure set forth in the above-mentioned U.S. Letters Patent 3,156,650, issued Nov. 10, 1964. The particles are placed in a die and aligned by an external field of 5,000 gauss. The powder was compacted at a pressure of 40 tons per square inch while the die was heated to a temperature of 200° C.

Examples of high energy magnetic materials, which were made in accordance with our invention, are set forth below.

EXAMPLE I

Apparatus was set up in accordance with FIGURE 1 of the drawing. Four grams were used in high energy magnetic fine particles having a core of an alloy of iron and cobalt and a coating surrounding the core of an oxide of iron and cobalt. These particles were spread over the interior of the bottom of an aluminum tray which was placed on the copper block. The quartz tube was positioned on the support block by threading this flange through the flange of the enclosure to which the gaseous material supply line and vacuum pump were connected. Ultraviolet light source, in the form of an Hanovia 700 watt lamp with a reflector, was positioned above the quartz tube and spaced about two inches from the upper surface of the high energy magnetic fine particles in the tray. The system was pumped down to a pressure of 10 microns of mercury and the control valve was closed. 1,3-butadiene was introduced in the gaseous state into the quartz tube. This monomer was maintained at its source (not shown) in liquid form by positioning in a cooling bath which was held at a temperature of —78° C. thereby providing a vapor pressure of approximately 4 millimeters of mercury. Upon opening of the control valve in the supply line, the gaseous butadiene was supplied to the quartz tube. A metal hood was positioned around the apparatus. The lamp, which had an effective wave length of the range from 2,000 angstroms to 3,500 angstroms, was turned on. Gaseous butadiene was supplied into the quartz tube under the above light for a period of six hours. No cooling of the substrate was employed in this example. The monomer was discontinued, the light was shut off, the system was again pumped down to about 10 microns to remove by-products. The high energy magnetic particles were agitated in their tray by employing a magnet which was held against the side of the quartz tube and which was tapped against the tube. The process was repeated again for four additional six hour periods thereby providing a total of 30 hours of radiation under the above lamp. The particles were agitated after each of the six-hour periods.

The process was concluded at the end of this time period by discontinuing the supply of gaseous butadiene, turning off the ultraviolet light source, removing the hood, opening the vacuum pump control valve, and pumping down the interior of enclosure 12 and tube 14 to a pressure of about 4 millimeters of mercury removing gaseous materials and byproducts therefrom. The vacuum was then broken and the quartz tube was removed by unthreading this flange from the enclosure flange. Visual examination disclosed an adherent film on at least a portion of the surfaces of the high energy magnetic particles. Subsequent examination of these particles under a microscope disclosed an adherent film on at least a portion of the surfaces of the particles. The film was estimated to be less than 1,000 angstroms thick.

EXAMPLE II

The same apparatus, method, particle type and gaseous monomer as were described above in Example I were employed in this example. The process was divided into ten three-hour irradiations which were interrupted by shaking of the tray with the particles therein as in Example I. Subsequent microscopic examination of the particles disclosed an adherent film on at least a portion of the surfaces of these particles which was estimated to be less than 1,000 angstroms in thickness.

EXAMPLE III

The same apparatus, method, particle type and gaseous monomer as were described above in Example I are employed in this example. However, in this example, the support block is cooled to a temperature of about 80° C. to maintain the tray and particles at this temperature. Such cooling is employed to reduce substantially the time required for film deposition. The process is divided into three ten-minute irradiations which are interrupted by shaking of the tray with particles therein as in Example I. At least a portion of the surfaces of these particles are coated with an adherent film of about 1,000 angstroms in thickness.

EXAMPLE IV

A permanent magnet was made from the coated particles formed above in Example I. The coated particles were placed in a die and aligned by an external D.C. magnetic field of 5,000 gauss. The particles were then pressed at 40 tons per square inch at a temperature of 200° C. to form a permanent magnet structure.

A permanent magnet was formed from the same type of particles as in Example I without the application of the oxidation inhibiting film in accordance with the procedure in Example IV. Both this magnet and the magnet described in Example IV, which are identified below as magnets 1 and 2, respectively, were subjected to an oxidizing atmosphere of 90 percent relative humidity at a temperature of 60° C. for a period of 240 hours. Table I sets forth below the results as percentage changes in saturation magnetization (Bis), coercive force (Hci), and maximum energy product [(BH) Max] for these magnets.

TABLE I

| | Percent Δ Bis | Percent Δ Hci | Percent (BH) ΔMa |
|---|---|---|---|
| Magnet Number: | | | |
| 1 | −31.3 | −5.7 | −47.6 |
| 2 | −10.5 | +1.5 | −8.8 |

While other modifications of the invention and variations thereof which may be employed within the scope of the invention have not been described, the invention is intended to include such as may be embraced within the following claims.

What we claim as new and desire to secure by Letters Patent of the United States is:

1. Magnetic material comprising high energy fine oxidizable magnetic particles, the dimensions of each of said particles being that of a single magnetic domain wherein the improvement comprises an oxidation inhibiting film on at least a portion of the surfaces of the particles, said film having been formed by ultraviolet surface photopolymerization of a monomer in the gaseous phase.

2. The magnetic material as in claim 1, in which the monomer is 1,3-butadiene.

3. The magnetic material as in claim 2, in which the particles are iron.

4. The magnetic material as in claim 2, in which the particles are alloys of cobalt and iron in atomic ratios of up to about 3 to 1.

5. The magnetic material as in claim 2, in which the particles have a core of an alloy of iron and cobalt and a coating surrounding the core of an oxide of iron and cobalt.

6. The magnetic material as in claim 1, in which the fine particles are aligned and compacted thereby forming a permanent magnet structure.

7. The magnetic material as in claim 6, in which the monomer is 1,3-butadiene.

8. The magnetic material as in claim 7, in which the particles are iron.

9. The magnetic material as in claim 7, in which the particles are alloys of cobalt and iron in atomic ratios of up to about 3 to 1.

10. The magnetic material as in claim 7, in which the particles have a core of an alloy of iron and cobalt and a coating surrounding the core of an oxide of iron and cobalt.

References Cited

UNITED STATES PATENTS

| | | | |
|---|---|---|---|
| 2,597,276 | 5/1952 | Altmann | 148—6.15 |
| 3,156,650 | 11/1964 | Falk | 252—62.5 |
| 3,200,007 | 8/1965 | Flowers | 117—138.8 |
| 3,406,040 | 10/1968 | Da Silva et al. | 117—93.31 |

OTHER REFERENCES

Kublitskii: Chem. Abstracts, 31 (1937), col. 6503, Abstract of Sintet. Kauchuk (U.S.S.R.), 1936, No. 7–8, 30–2.

TOBIAS E. LEVOW, Primary Examiner

A. P. DEMERS, Assistant Examiner

U.S. Cl. X.R.

117—93.31, 161; 148—31.55, 31.57, 101; 204—159.22; 260—94.2